US008607080B2

(12) United States Patent
Gervais et al.

(10) Patent No.: US 8,607,080 B2
(45) Date of Patent: Dec. 10, 2013

(54) OPTIMIZING VOLTAGE ON A POWER PLANE USING A HOST CONTROL UNIT TO CONTROL A NETWORKED VOLTAGE REGULATION MODULE ARRAY

(75) Inventors: Gilles Gervais, Austin, TX (US); Alain Loiseau, Williston, VT (US); Kirk D. Peterson, Jericho, VT (US); Norman J. Rohrer, Underhill, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/399,799

(22) Filed: Feb. 17, 2012

(65) Prior Publication Data
US 2012/0159203 A1   Jun. 21, 2012

Related U.S. Application Data

(63) Continuation of application No. 12/037,743, filed on Feb. 26, 2008, now Pat. No. 8,341,434.

(51) Int. Cl.
*G06F 1/00*   (2006.01)

(52) U.S. Cl.
USPC ........................................................ 713/300

(58) Field of Classification Search
USPC ........................................................ 713/300
See application file for complete search history.

(56) References Cited

U.S. PATENT DOCUMENTS

RE38,891 E * 11/2005 Danstrom ...................... 713/300
2006/0061214 A1 * 3/2006 Chapuis .......................... 307/11

OTHER PUBLICATIONS

U.S. Appl. No. 12/037,743 entitled "Utilizing Networked Three Dimensional Voltage Regulation Modules (VRM) to Optimize Power and Performance of a Device"; Notice of Allowance dated Aug. 13, 2012.
U.S. Appl. No. 12/037,743 entitled "Utilizing Networked Three Dimensional Voltage Regulation Modules (VRM) to Optimize Power and Performance of a Device"; Non-final office action dated Feb. 12, 2012.
U.S. Appl. No. 12/037,743 entitled "Utilizing Networked Three Dimensional Voltage Regulation Modules (VRM) to Optimize Power and Performance of a Device"; Final office action dated Oct. 3, 2011.
U.S. Appl. No. 12/037,743 entitled "Utilizing Networked Three Dimensional Voltage Regulation Modules (VRM) to Optimize Power and Performance of a Device"; Non-final office action dated Mar. 28, 2011.
U.S. Appl. No. 12/037,743 entitled "Utilizing Networked Three Dimensional Voltage Regulation Modules (VRM) to Optimize Power and Performance of a Device"; Non-final office action dated Jan. 19, 2011.

* cited by examiner

*Primary Examiner* — Mohammed Rehman
(74) *Attorney, Agent, or Firm* — Yudell Isidore Ng Russell PLLC

(57) ABSTRACT

A method, system, and computer program for using an array of networked 3D voltage regulation modules (VRMs) to optimize power usage by components on a voltage island in real time is presented. The networked VRM devices work in parallel to supply adequate power to connected voltage islands, and to supplement other VRMs in the system that may require additional power in the case of a critical event.

2 Claims, 4 Drawing Sheets

OPTIMIZING VOLTAGE ON A POWER PLANE USING A HOST CONTROL UNIT TO CONTROL A NETWORKED VOLTAGE REGULATION MODULE ARRAY

CROSS-REFERENCE TO RELATED APPLICATION

The present application claims priority under 35 U.S.C. §120 as a continuation application to application Ser. No. 12/037,743, entitled "Utilizing Networked 3D Voltage Regulation Modules (VRM) to Optimize Power and Performance of a Device," filed on Feb. 26, 2008, which is hereby incorporated by reference in its entirety.

BACKGROUND OF THE INVENTION

The present invention relates in general to computers, and in particular to computer hardware. Still more particularly, the present invention relates to a system, method, and computer program for optimizing power and performance of a device through the use of networked 3D Voltage Regulation Modules

SUMMARY OF THE INVENTION

A method, system, and computer program for using an array of networked 3D voltage regulation modules (VRMs) to optimize power usage by components on a voltage island in real time is presented. The networked VRM devices work in parallel to supply adequate power to connected voltage islands, and to supplement other VRMs in the system that may require additional power in the case of a critical event.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed descriptions of an illustrative embodiment when read in conjunction with the accompanying drawings, wherein:

DETAILED DESCRIPTION OF THE PREFERRED EMBODIMENT

Figure 1:
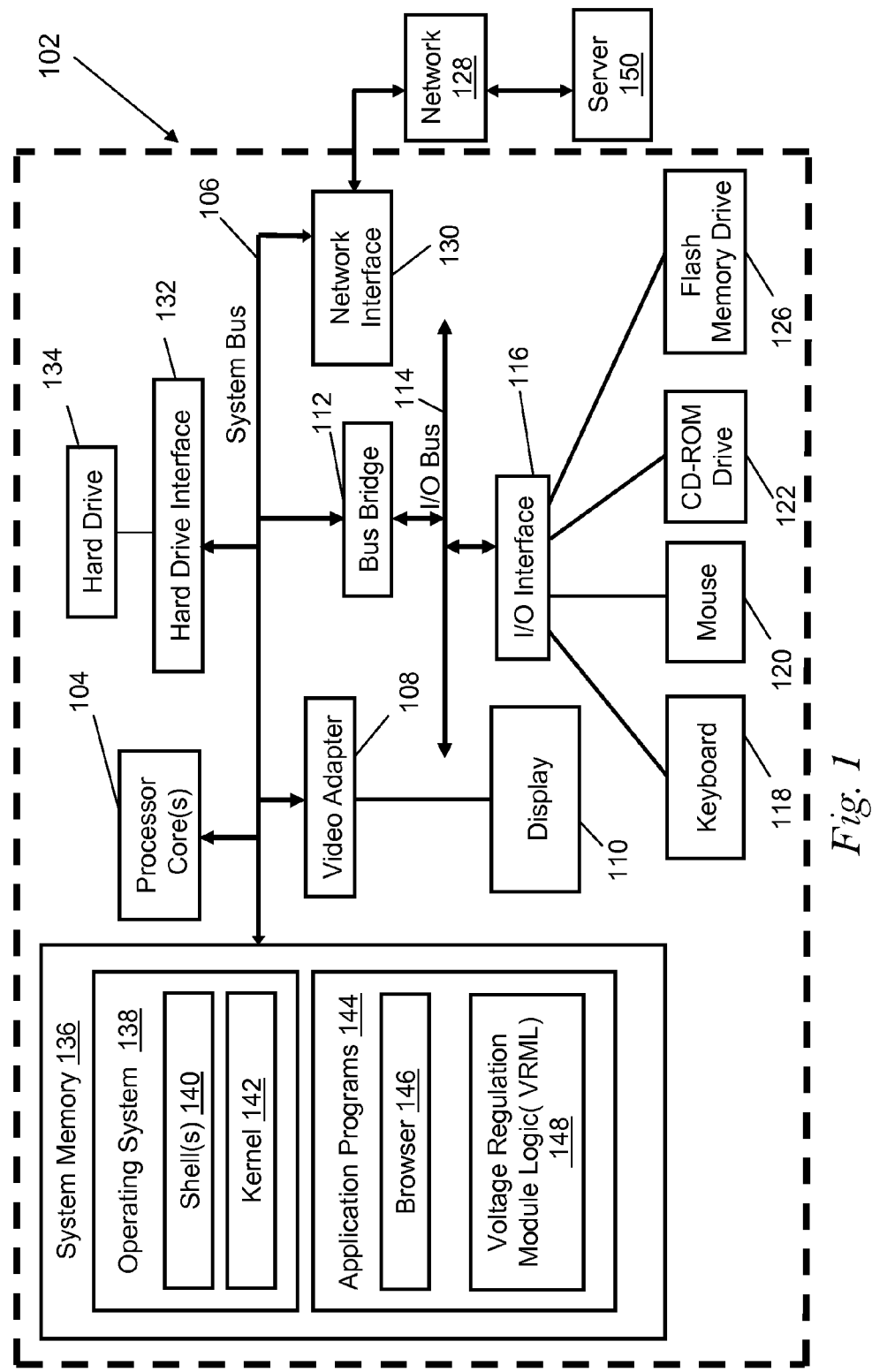
FIG. 1 is a block diagram of a data processing system in which the present invention may be implemented.

With reference now to FIG. 1, there is depicted a block diagram of an exemplary computer 100 in which the present invention may be implemented. Computer 102 includes one or more processor cores 104 that are coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Computer 102 is able to communicate with a software deploying server 150 via a network 128 using a network interface 130, which is coupled to system bus 106. Network 128 may be an external network such as the Internet, or an internal network such as an Ethernet or a Virtual Private Network (VPN). Note the software deploying server 150 may utilize a same or substantially similar architecture as computer 102.

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (also called a command processor) is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a browser 146. Browser 146 includes program modules and instructions enabling a World Wide Web (WWW) client (i.e., computer 102) to send and receive network messages to the Internet using Hyper-Text Transfer Protocol (HTTP) messaging, thus enabling communication with software deploying server 150.

Application programs 144 in computer 102's system memory (as well as software deploying server 150's system memory) also include a Voltage Regulation Module Logic (VRML) 148. VRML 148 includes code for implementing the processes described in FIGS. 2-4.

The hardware elements depicted in computer 102 are not intended to be exhaustive, but rather are representative to highlight essential components required by the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention.

Note further that, in a preferred embodiment of the present invention, software deploying server 150 performs all of the functions associated with the present invention (including execution of PCL 148), thus freeing computer 102 from having to use its own internal computing resources to execute PCL 148.

Figure 3:
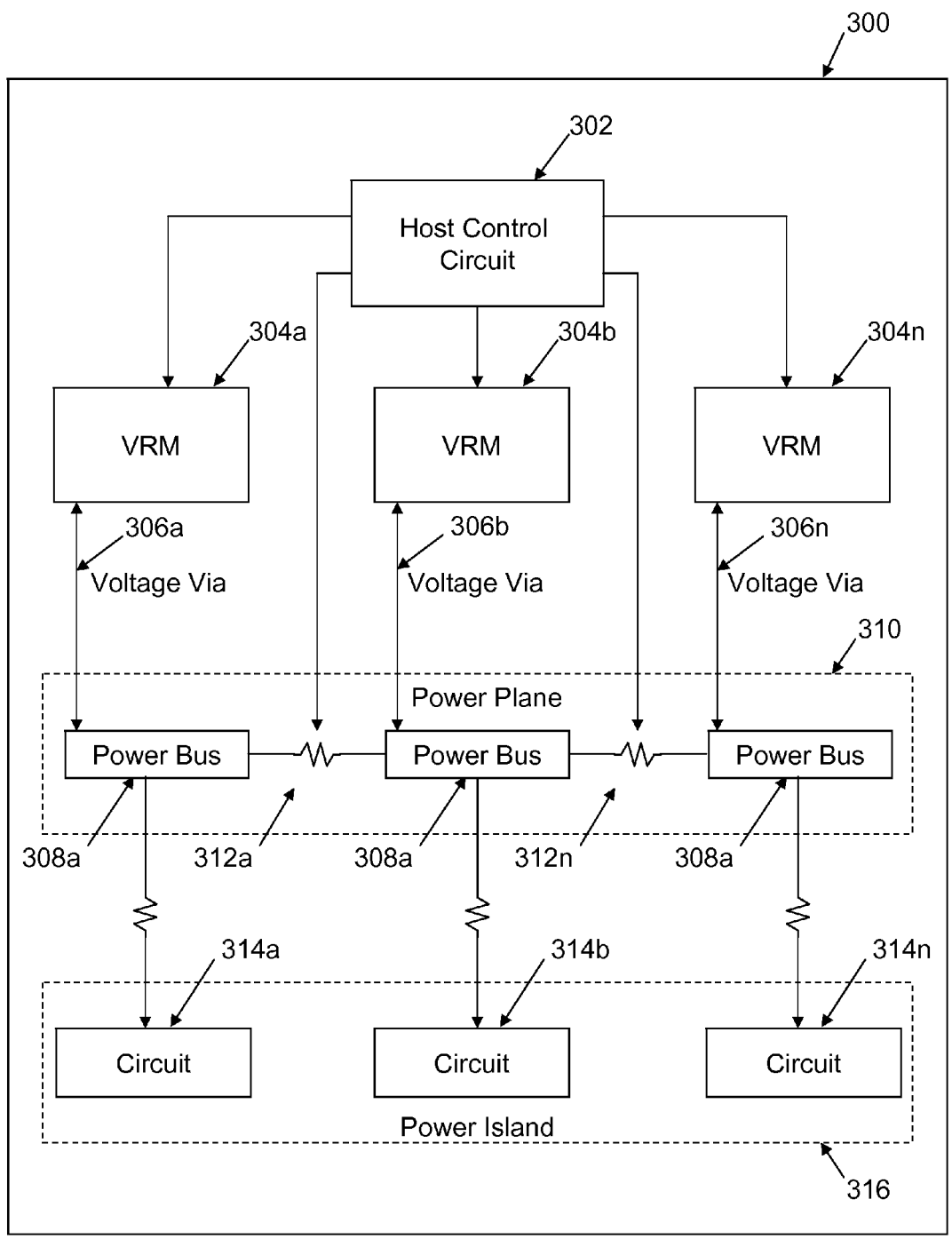
FIG. 3 depicts exemplary components of the overall system incorporating a host controller for direct VRM control.

Note also server 150 and controller 300, shown in FIG. 3 may utilize a similar construction and logic for computer 102.

Figure 2:
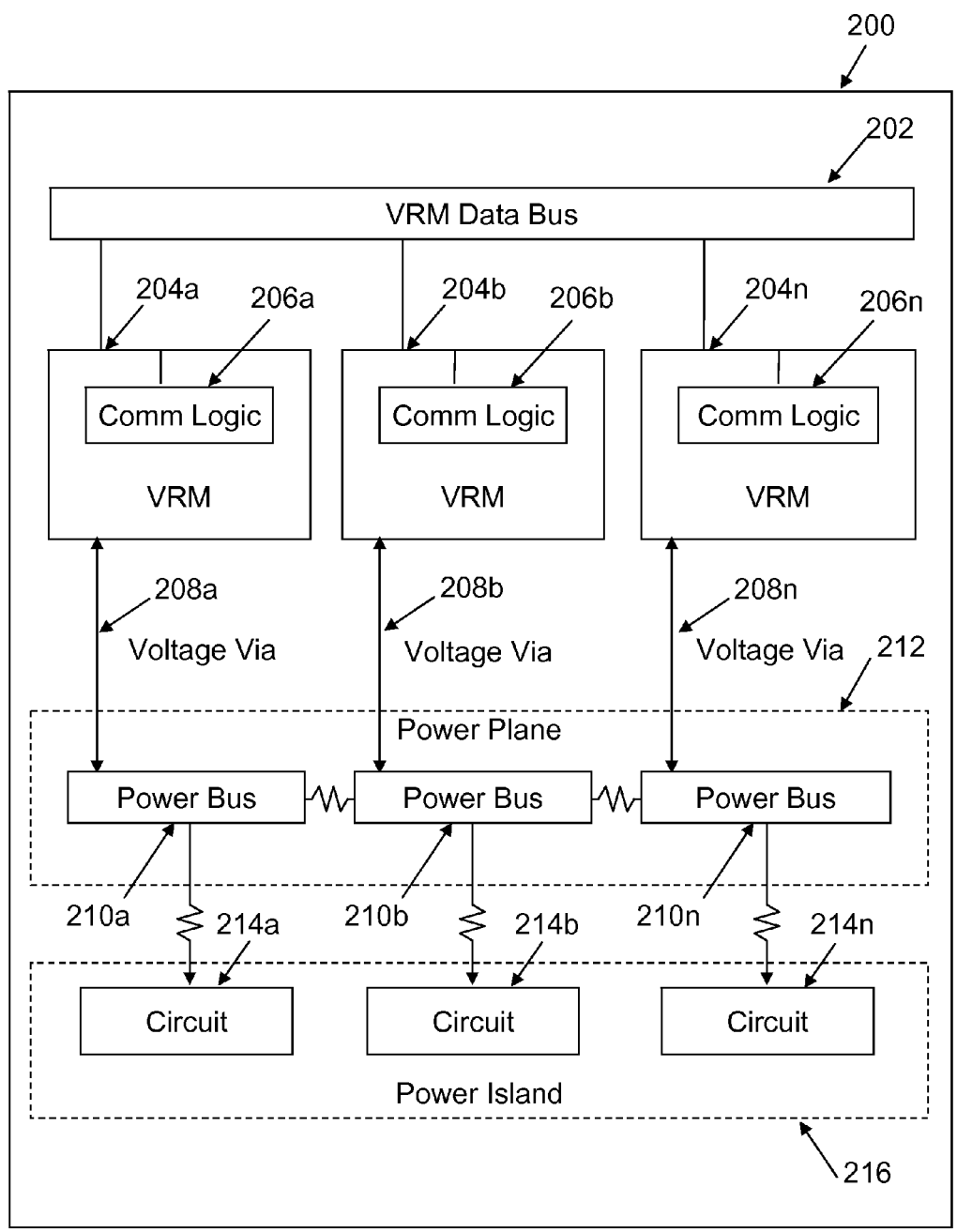
FIG. 2 depicts exemplary components of the overall system incorporating a common 3D VRM data bus for VRM intercommunication.

With reference now to FIG. 2, a high level illustration detailing exemplary components of the overall system incorporating a common 3D VRM data bus for VRM inter-communication. A computer chip 200 on which three dimensional (3D) Voltage Regulation Modules are attached, is presented. VRM 204a-n communicates directly with other VRMs 204a-n on the VRM Data Bus 202 using a Comm Logic 206a-n, an element of VRM 204a-n. Comm Logic 206a-n is internal to the VRM 204a-n itself and governs the communication of power consumption and operation data to other VRMs 204a-n. The VRMs 204a-n supply power directly to the Components 208a-n of Voltage Island 210. Concurrently, the VRMs 204a-n measure the current power consumption of respective Components 206a-n in which a specific VRM 204a-n is connected. When the power consumption value of a Component 208a-n, exceeds a critical level, critical VRM 204a-n sends notice using Comm Logic 206a-n to all networked VRMs 204a-n in Computer Chip 200 to supply surplus power through Voltage Vias 212a-n to the Voltage Bus 214. Critical VRMs 204a-n can then utilize surplus power from the Voltage Bus 214 as supplementary voltage to aid in the powering of critical Component 208a-n, until the critical voltage event has subsided.

With reference now to FIG. 3, a high level illustration detailing exemplary components of the overall system, incorporating a common Host Control Circuit 302 for 3D VRM control. A computer chip 200 on which three dimensional (3D) Voltage Regulation Modules are attached, is presented. The Host Control Unit 302 measures the current power usage of VRMs 304a-n, and controls the power output of the VRMs 304a-n while the Computer Chip 300 is on. The VRMs 304a-n continuously supply power to the Components 208a-n of Voltage Island 210. If the power consumption value of a Component 208a-n, exceeds a critical level, the Host Control Circuit 302 will redirect surplus power from all non-critical VRMs 304a-n through Voltage Vias 212a-n to the Voltage Bus 214. The Host Control Unit 302, instructs all critical VRMs 304a-n to utilize surplus power from the Voltage Bus 214 as supplementary voltage to aid in the powering of critical Component 208a-n, until the critical voltage event has subsided.

With reference now to FIG. 2, a high level illustration detailing exemplary components of the overall system incorporating a common 3D VRM data bus for VRM inter-communication. A computer chip 200 on which three dimensional (3D) Voltage Regulation Modules (VRMs) 204a-n are attached, is presented. VRMs 204a-n communicates directly with each other on the VRM Data Bus 202 using a Comm Logic 206a-n, an element of VRMs 204a-n. Comm Logic 206a-n is internal to the VRM 204a-n itself and governs the communication of power consumption and operation data to other VRMs 204a-n. The VRMs 204a-n supply power directly to the Components 214a-n of Voltage Island 216. Concurrently, the VRMs 204a-n measure the current power consumption of respective Components 214a-n in which a specific VRM 204a-n is connected. When the power consumption value of a Component 214a-n, exceeds a critical level, critical VRM 204a-n sends notice using Comm Logic 206a-n to all networked VRMs 204a-n in Computer Chip 200 to supply surplus power through Voltage Vias 208a-n to the Voltage Bus 210a-n of Power Plane 212. Critical VRMs 204a-n can then utilize surplus power from the Voltage Bus 210a-n as supplementary voltage to aid in the powering of critical Components 214a-n, until the critical voltage event has subsided.

With reference now to FIG. 3, a high level illustration detailing exemplary components of the overall system, incorporating a common Host Control Circuit 302 for 3D VRM control. A computer chip 300 on which three dimensional (3D) Voltage Regulation Modules (VRMs) 304a-nare attached, is presented. The Host Control Unit 302 measures the current power usage of VRMs 304a-n, and controls the power output of the VRMs 304a-n while the Computer Chip 300 is on. The VRMs 304a-n continuously supply power to the Components 314a-n of Voltage Island 316. If the power consumption value of a Component 314a-n, exceeds a critical level, the Host Control Circuit 302 will redirect surplus power from all non-critical VRMs 304a-n through Voltage Vias 306a-n to the Voltage Bus 308a-n of Power Plane 310. Host Control Unit 302, instructs all critical VRMs 304a-n to utilize surplus power from the Voltage Bus 308a-n as supplementary voltage to aid in the powering of critical Components 314a-n, until the critical voltage event has subsided.

Figure 4:
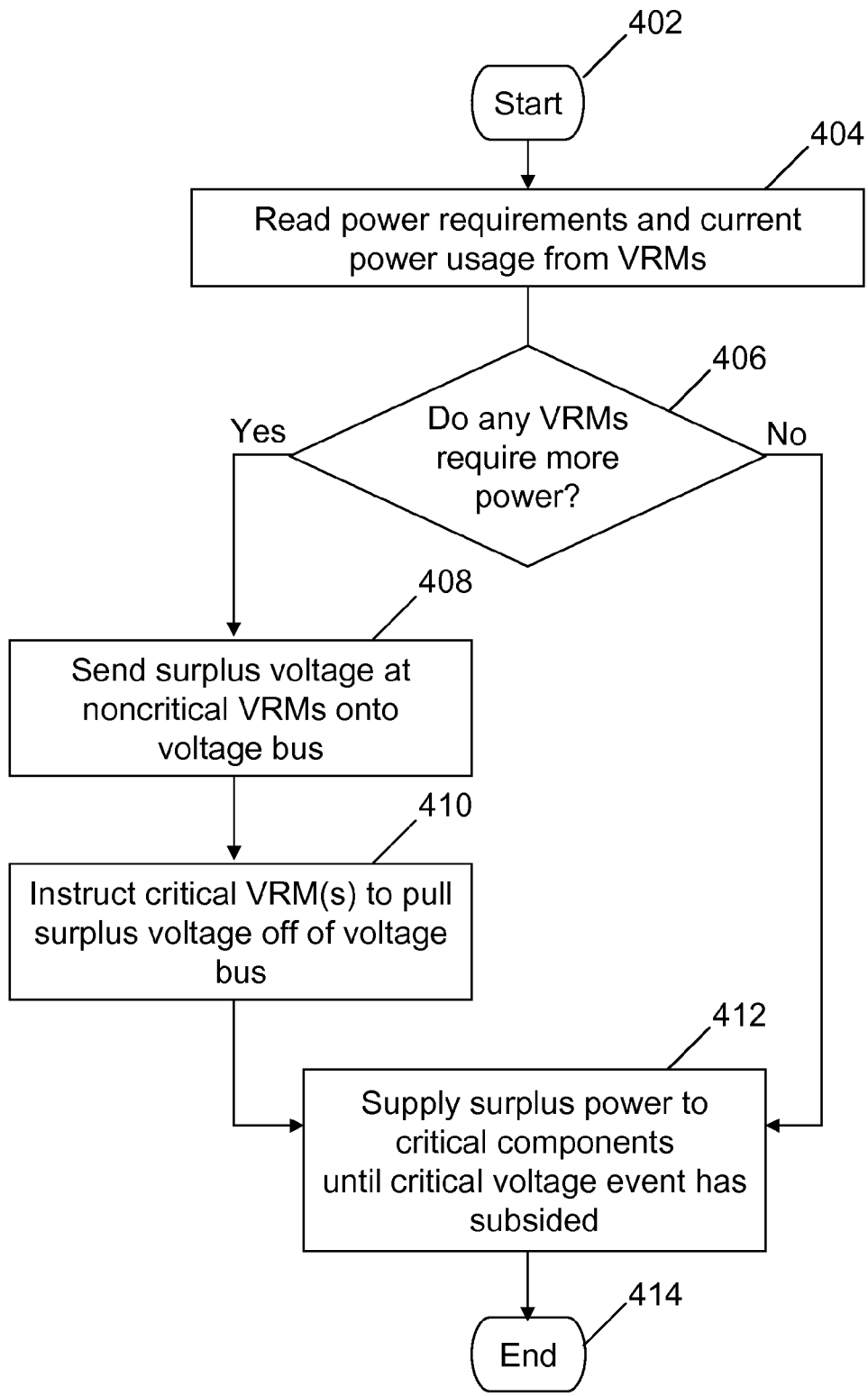
FIG. 4 is a high-level logical flowchart of an exemplary set of steps performed to determine if any VRMs in the system require supplemental power due to a critical event.

With reference now to FIG. 4, a high-level logical flowchart of an exemplary set of steps performed to determine if any VRMs in the system require supplemental power due to a critical event. After initiator block 402, the power requirements and current power usage are measured for each VRM in the array (block 404). The logic of the array then determines if any of the VRMs require additional power to maintain proper operation of connected components (block 406). When additional power is not required at a critical VRM(s), the process terminates at block 414. When additional power is required at a critical VRM the chip's logic instructs the all noncritical VRMs with surplus power to add surplus voltage to the voltage bus (block 408). The chip's logic then instructs the critical VRM(s) to utilize surplus voltage from the voltage bus (block 410). The surplus power is supplied to components connected to the critical VRM(s), until the critical voltage event has subsided (block 412). The process terminates at terminator block 414.

The invention claimed is:

1. A system comprising:
   an array of networked three dimensional (3D) voltage regulation modules (VRMs), configured to communicate directly within said array via a host control circuit, wherein each VRM in the array of networked three dimensional 3D VRMs is connected to a corresponding voltage bus, and wherein the host control circuit is common to the array of networked three dimensional 3D VRMs and controls a power output of each 3D VRM in the array of networked 3D VRMs;
   a processor;
   a data bus coupled to the processor;
   a memory coupled to the data bus; and
   a non-transitory computer-usable storage medium embodying computer program code, the computer program code comprising instructions executable by the processor and configured to enable said host control circuit to:
   determine a power requirement for each VRM in the array of networked 3D VRMs;
   measure a current power usage for each VRM in the array of networked 3D VRMs;
   determine whether a critical event exists where a power output from one or more critical VRMs among the array of networked 3D VRMs that powers one or more components of a plurality of components is inadequate to maintain proper operation of the one or more components; and in response to the host control circuit determining the power output to the one or more components is inadequate to maintain proper operation of the one or more components:

instruct one or more non-critical VRMs from among the array of networked 3D VRMs that have a surplus power to redirect a surplus voltage to a corresponding one or more voltage buses through one or more voltage vias; and instruct the one or more critical VRMs to utilize the surplus voltage on the corresponding one or more voltage buses as supplementary voltage to aid powering of the one or more components until the critical event has subsided.

2. The system of claim 1, wherein the host control circuit is further configured to:

in response to determining the power consumption of the one or more components exceeds a critical level, redirect a surplus voltage to the corresponding one or more voltage buses through the one or more voltage vias.

\* \* \* \* \*